Feb. 21, 1967     L. W. ALVAREZ     3,305,294
TWO-ELEMENT VARIABLE-POWER SPHERICAL LENS
Filed Dec. 3, 1964     2 Sheets-Sheet 1

INVENTOR.
LUIS W. ALVAREZ
BY
*Lippincott, Ralls & Hendricson*
ATTORNEYS

INVENTOR.
LUIS W. ALVAREZ
BY
Lippincott, Ralls & Hendricson
ATTORNEYS

United States Patent Office 3,305,294
Patented Feb. 21, 1967

3,305,294
TWO-ELEMENT VARIABLE-POWER SPHERICAL LENS
Luis W. Alvarez, Berkeley, Calif., assignor to Optical Research and Development Corporation, Oakland, Calif., a corporation of California
Filed Dec. 3, 1964, Ser. No. 418,372
6 Claims. (Cl. 351—169)

This application is a continuation-in-part of my prior co-pending patent application Serial No. 201,453, filed June 11, 1962, now abandoned, and relates to a two-element, variable-power, spherical lens having many uses, and particularly useful in spectacles. The present invention makes possible simple, inexpensive, thin, and attractive variable-power spectacles that can be focused quickly and easily for near and distant vision, and yet provide a sharp, substantially undistorted view throughout the field of vision at each setting. The new lens is also useful in cameras and other optical devices.

It has been recognized heretofore that a simple, thin, variable-power, or variable-focal length, spherical lens would be very desirable, particularly in spectacles. The reduced accommodation characteristic of aging of the eye is poorly corrected by the bifocal and trifocal spectacles now in common use. With bifocals, only part of the normal field of vision, usually a lower part, is in focus for near vision, while another part of the field, usually the upper part, is in focus for distant vision. This may be adequate, though certainly not optimum, for normal reading and for looking at the horizon—it may also lead to the hazard of double vision when descending stairs, and to grotesque contortions when trying to read the titles of books on the top shelf of a library stack. On the other hand, thick, multi-element lens systems, such as conventional zoom camera lenses are obviously unsuitable for spectacles and have certain disadvantages even for cameras.

It has been previously suggested in U.S. Patents 2,001,952 and 2,475,275, for example, that a two-element, variable-focus spherical lens might be employed to advantage in spectacles and elsewhere. However, the teachings of the prior art have failed to disclose how to succeed in making such a lens, having a useful power variation with a reasonably small motion of the lens elements relative to their size, without introducing so much distortion in the lens system as to make the lenses practically valueless. In particular, the prior art has suggested making such lenses by grinding lens elements having surfaces shaped like segments of a cone, or as the involute of a circle, and the like. Such lens elements introduce intolerable amounts of distortion if designed for a usefully large range of power variation. (Note U.S. Patent 2,475,275, column 1, lines 39–42, which recognizes the problem, but proposes another unsuccessful solution.)

The present invention provides a two-element, variable-power spherical lens, which can be and has been successfully designed and constructed for substantial variations in power with small movements of the lens elements relative to their size, and which is substantially free of distortion over the whole field of view. This result is obtained by forming the lens elements substantially in accordance with a novel thickness equation herein disclosed.

In brief, the new, variable-power spherical lens is composed of two thin lens elements arranged in tandem, one behind the other along the optical axis of the lens system, the optical axis being substantially normal to the lens surfaces and passing substantially through their centers. At least one of these lens elements is movable in a direction transverse to the optical axis, and preferably both lens elements are moved by equal amounts in opposite directions along the same transverse axis. In order to precisely define the lens parameters it is convenient to employ a rectangular coordinate system of mutually perpendicular axes $x$, $y$ and $z$. The optical axis of the lens system is taken to be the $z$ axis and the lens thickness $t$ is measured parallel to this axis in the following notations. If the direction of lens motion is designated the $x$ axis of a coordinate system, and a $y$ axis is designated perpendicular to the $x$ axis and also perpendicular to the optical axis $z$ of the lens system, the optical thickness of each lens element is defined by a lens equation in $x$ and $y$ in which the characterizing terms are:

$$t = A(xy^2 + \tfrac{1}{3}x^3)$$

In this equation, it will be understood that $x$ and $y$ refer to distances along the $x$ and $y$ axes respectively, that A is a constant, which determines the rate at which the power of the lens varies with movement of the lens elements relative to each other along the $x$ axis, and that $t$ represents the optical thickness of the lens element at each point defined by the coordinates $x$ and $y$. Optical thickness means the effective lens thickness parallel to the optical axis, taking into account both the geometrical thickness of the lens element, taken in the mean direction of light rays passing through the lens, and the refractive index of the material of which the lens element is formed. If the lens material is of uniform refractive index, $t$ may be taken as the geometrical thickness; but if there are variations in the refractive index, there will, of course, be compensating variations in the geometrical thickness. The thickness equations for both lens elements should contain the same characterizing terms, with the exception that the constant A has opposite algebraic signs ($+$ and $-$) in the equations of the two lens elements.

Inasmuch as the lens thickness varies it is necessary to reference the thickness $t$ to the lateral location, and this may be best accomplished by defining the location in terms of $x$ and $y$ coordinates lying in a plane perpendicular to the optical axis $z$. Of course, in all of the following equations proper dimensioned relationship must be maintained.

In addition to the characterizing terms, the thickness equations of the two lens elements may have other, optional terms; provided, that such optional terms shall not contain any power of $x$ higher than the second power, or any power of $xy$ other than the first, having a coefficient of considerable magnitude relative to the constant A. Thus, the complete lens equation may be written:

$$t = A(xy^2 + \tfrac{1}{3}x^3) + Bx^2 + Cxy + Dx + E + F(y)$$

in which B, C, D, and E are constants that may be given any practical value, including zero, and $F(y)$ is a function that is independent of $x$ and may be zero. The values of B, C, D, E, and $F(y)$ need not be the same in the thickness equations of the two lens elements; but, as already noted, the magnitude of A should be the same in both equations, with opposite algebraic signs.

It will be noted that the complete lens equation given below is a solution of the following triad of differential equations, which may be considered an alternate criteria for the novel lens elements disclosed herein:

$$\partial^3 t / \partial x^3 = 2A$$

$$\partial^3 t / \partial x \partial y^2 = 2A$$

$$\partial^3 t / \partial x^2 \partial y = 0$$

The invention may be better understood from the following illustrative description and the accompanying drawings.

Figure 12:
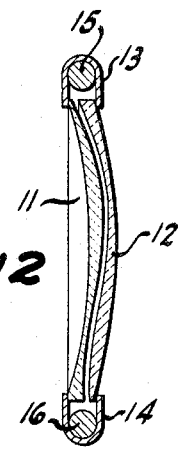
Figure 6:
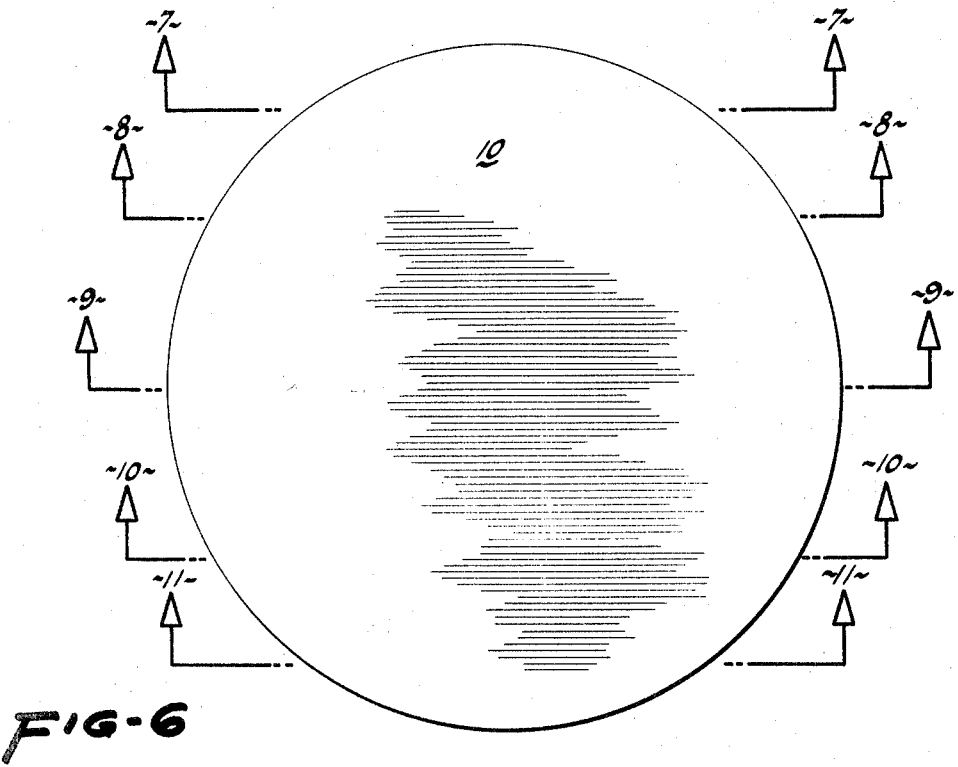
FIGURE 6 is a plan view of another lens element according to this invention.
Figure 7:
Figure 8:
Figure 9:
Figure 10:
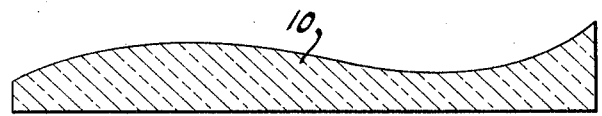
Figure 11:
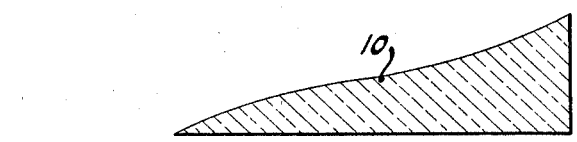

FIGURES 7, 8, 9, 10, and 11 are sections taken along the lines 7—7, 8—8, 9—9, 10—10, and 11—11, respectively, of FIGURE 6, the thickness of the lens element being exaggerated for clarity;

FIGURE 12 is a vertical section through a pair of lens elements arranged as a variable-power spectacle lens.

Figure 1:
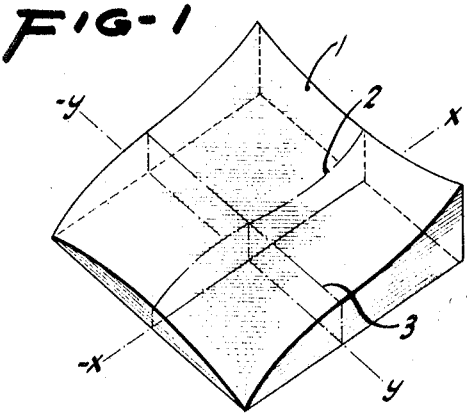
FIGURE 1 is a projection view of a lens element formed with a thickness that varies in accordance with the characterizing terms of the lens equation of this invention, the thickness being exaggerated for clarity.

FIGURE 1 illustrates a lens element 1 having a thickness that varies in accordance with the characterizing terms of the lens equation of this invention. The thickness is exaggerated in the drawing for clarity; preferably, particularly for spectacle lenses, the lens element is quite thin in relation to its width, and the top and bottom faces are almost the same in shape. Hence, mathematical approximations valid for thin lenses can be used in deriving the basic lens equations. Element 1 may be made of optical glass, transparent plastic, or any other material suitable for the manufacture of lenses. As illustrated, it has a flat bottom face, and has a top face formed as a curved surface defined by the lens equation. However, it is not essential that the lens surfaces be of any particular shape, provided the thickness variations are substantially in accordance with the equation. For example, the bottom surface can be made spherical, and the shape of the top surface altered accordingly to maintain the thickness at each point unchanged; or the thickness variations can be distributed equally above and below a flat or curved median plane.

The present invention is herein defined in terms of lens thickness as a function of $x$ and $y$ coordinates. This definition is in the form most directly usable with present day machines capable of producing the lens elements. It is also to be understood that the lens surfaces are not to be rough, i.e., they are to be polished. A general limitation upon the lens shape is that the surfaces should not be so steep that total reflection occurs. Restriction of the thickness variation to no more than one-half the lens width is a reasonable limitation. In the following relationships the angles of the lens surfaces with respect to a plane normal to the optical axis is limited to less than 30 to 40 degrees so that the angle in radians may be substituted for the sine thereof. Aside from the foregoing general limitations, the lens combination may have a wide variety of shapes including planar, as shown, elliptical, cylindrical, and spherical. Thus one surface of the lens element can be a regular surface of revolution, which in the context of the present disclosure will mean a surface which can be planar, elliptical, cylindrical, spherical, or the like.

The broken lines 2 and 3 represent two planes perpendicular to the bottom surface of lens element 1, and to each other, which intersect at the center of the lens element. The intersection of planes 2 and 3 is a straight line, perpendicular to the bottom surface of lens element 1, near and parallel to the optical axis of the lens formed by placing two of the lens elements in tandem. In the description of a single lens element, it can be assumed that the intersection of planes 2 and 3 is the optical axis. An $x$ axis and a $y$ axis, perpendicular to the optical axis and to each other, will be assumed, the $x$ axis lying in plane 2 with positive values of $x$ extending upward to the right in FIGURE 1, and the $y$ axis lying in plane 3 with positive values of $y$ extending downward to the right in FIGURE 1. Thus an $x$, $y$ coordinate system is established, in which the value of $x$ represents the distance of a given point in the lens above and to the right of plane 3 if $x$ is positive, or below and to the left of plane 3 if $x$ is negative. The value of $y$ represents the distance of the same point below and to the right of plane 2 if $y$ is positive, or above and to the left of plane 2 if $y$ is negative. Thus, every point upon the top surface of lens element 1 can be identified by its $x$ and $y$ coordinates. At each such point, the optical thickness $t$ of the lens element, parallel to the optical axis, is defined by the equation:

$$t_1 = A(xy^2 + \tfrac{1}{3}x^3) + E$$

in which $t_1$ is the optical thickness of lens element 1 at the point having the coordinates $x$, $y$, and A is a constant that determines the power variation in a lens system responsive to a given movement of element 1, as is more fully explained hereinafter, and E is a constant representing the thickness of element 1 at its center along the intersection of planes 2 and 3. In practice, the value of E is usually made just large enough to insure that the thinnest part of the lens element will have a practical, minimum thickness to give the lens adequate mechanical strength.

It will be observed from the drawing, and from the foregoing equation, that the thickness of the lens element 1 is constant at $x=0$, whereby the intersection of plane 3 with the upper surface of the lens element is a straight line. At $y=0$, the thickness of the lens element varies as the cube of $x$. Hence, the intersection of plane 2 with the upper surface is a cubic curve that is horizontal at the center of the lens element, turns upward with progressively increasing curvature toward the upper right portion of FIGURE 1, and turns downward with increasing curvature toward the lower left portion of FIGURE 1. For positive values of $x$, the thickness increases as the square of $y$, while for negative values of $x$, the thickness decreases as the square of $y$. Hence, the intersections of the upper surface with planes parallel to plane 3 are parabolic curves, concave for positive values of $x$ and convex for negative values of $x$, which progressively increase in curvature as the value of $x$ increases. It will be appreciated that this detailed description of the upper surface of lens element 1 is merely for the purpose of making it easy to visualize the thickness variations prescribed by the lens equation—if the bottom surface were not flat, the upper surface would have a shape different from that described, but the thickness of the lens element at each point $x$, $y$ would remain substantially the same.

Figure 2:
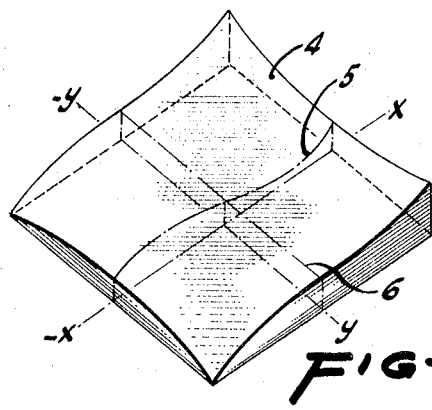
FIGURE 2 is a projection view of such a lens element wherein optional terms of the lens equation have been adjusted to reduce the lens thickness.

In lens element 1, it will be noted that every point above and to the right of plane 3 is as thick as, or thicker than, any point below and to the left of plane 3, so that the lens element as a whole is somewhat wedge-shaped. In the optical systems hereinafter described, such a wedge-shaped form of the lens elements would unnecessarily increase the thickness of the composite lens. Thinner lens elements, and hence thinner lens systems, may be obtained without materially altering the optical properties of the composite lens, by subtracting from the thickness of the lens element a wedge-shaped volume or prism defined in the lens equation by a term that is linear in $x$ and has a coefficient selected to make the thickest portion of the lens element above plane 3 (positive values of $x$) approximately of the same thickness as the thickest portion below plane 3 (negative values of $x$). This is approximately equivalent to rotating the upper surface of the lens element about its $y$ axis, while holding the bottom surface fixed. For small angles of rotation, the coefficient D of the lens equation is equal to the angle of rotation expressed in radians. FIGURE 2 illustrates a lens element 4 in which the thickness has been reduced in this manner; the broken lines 5 and 6 represent the $x$ axis and $y$ axis planes, corresponding to the planes represented by broken lines 2 and 3, respectively. The lens equation for element 4 is:

$$t_4 = A(xy^2 + \tfrac{1}{3}x^3) + Dx + E$$

It will be noted that the lens equation for element 4 is identical to the lens equation for element 1, except for addition of the optional term $Dx$, in which the value of the coefficient $D$ may be selected to minimize the lens thickness. Standing alone, this optional term would describe a prism—thickness increasing linearly with $x$. By assigning an appropriate negative value to the coefficient $D$, the thickest point along the $x$ axis of the lens element, which will occur at a negative value of $x$ after rotation of the upper surface, can be made approximately equal in thickness to the thickest portions along the edge of the lens element, which occur at the upper corners in FIGURES 1 and 2, thereby permitting a smaller value of $E$ and achieving a minimum thickness for the whole lens element.

Figure 3:
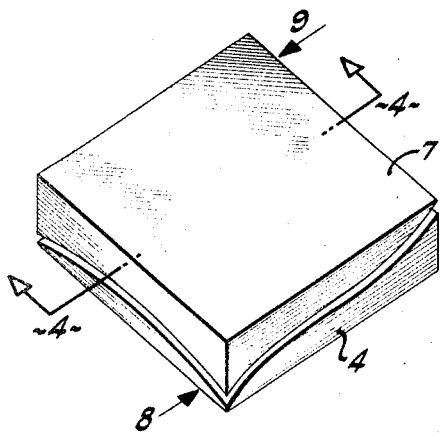
FIGURE 3 is a projection view of two lens elements, each similar to the element illustrated in FIGURE 2, arranged in tandem to form a variable-power, spherical lens.

FIGURE 3 illustrates two lens elements, of the type shown in FIGURE 2, arranged in tandem along a common optical axis to form a variable-power spherical lens. The optical axis passes through the center of the composite lens normal to the flat surfaces of the two lens elements. Lens element 7 may be identical to lens element 4, rotated 180° around its $y$ axis and placed on top of element 4 as illustrated. Thus, in terms of the $x$, $y$ coordinate system of element 4, wherein the positive $x$ direction is toward the upper right edge of the figure, and the positive $y$ direction is toward the lower right edge of the figure, the lens equation of element 7 is:

$$t_7 = -A(xy^2 + \tfrac{1}{3}x^3) - Dx + E$$

It will be noted that the lens equation of element 7 is identical to the lens equation of element 4, except for a reversal of the algebraic sign of all terms of the lens equation except the constant term $E$. This reversal of sign results from turning the lens element 7 over in such a way that the positive and negative directions along its $x$ axis are reversed.

Figure 4:
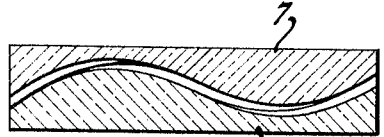
FIGURE 4 is a section taken along the plane of line 4—4 of FIGURE 3, the two lens elements being shown in neutral or zero-power positions.

In the neutral or zero-power position of the lens element, illustrated in FIGURES 3 and 4, the curved surface of element 7, now at the bottom of this element, exactly fits the curved top surface of element 4, so that the two elements 4 and 7 could fit together perfectly with no space between them. However, in practice, a small space is left between the two lens elements to permit the movement of one element relative to the other for adjusting the power of the lens. As a rule, the space between the two elements should be as small as is conveniently practicable, not only to keep the overall thickness of the lens system small for utilitarian purposes, but also to preserve the validity of the thin-lens approximations employed in the basic design of the lens elements.

The optical thickness $t_c$ of the composite lens at any point is equal to the sum of the optical thicknesses of lens elements 4 and 7 at that point. In the neutral or zero-power position of the lens elements, as illustrated in FIGURES 3 and 4, the composite optical thickness is obtained simply by adding the lens equation for elements 4 and 7, as follows:

$$t_c = t_4 + t_7 = 2E$$

It will be noted that the optical thickness of the composite lens is a constant; hence, the composite lens, in the neutral position of the lens elements, is optically equivalent to a flat plate of glass.

Figure 5:
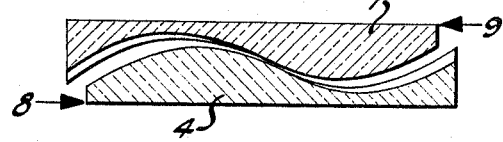
FIGURE 5 is a section similar to FIGURE 4, but showing the two lens elements moved relative to each other to change the power of the lens.

FIGURE 5 shows the bottom lens element 4 moved slightly to the right (in the positive direction along the $x$ axis) relative to the upper lens element 7. Preferably, both lens elements are moved by equal amounts in opposite directions along the $x$ axis, transverse to the optical axis of the lens system, as indicated by the arrows 8 and 9 in FIGURES 3 and 5. Points in the plane of the lens system may now be identified by a system of coordinates X, Y that remain stationary while the lens elements move in opposite directions along the X axis, the X axis extending in the direction of motion of the lens elements transverse to the optical axis, and the Y axis extending perpendicular to both the X axis and the optical axis, the optical axis passing through the point $X=0$, $Y=0$. If $d$ represents the distance that each lens element moves in the X direction, the thickness equations for the two lens elements, in terms of the stationary X, Y coordinate system, may be written $$t_4 = A(X-d)Y^2 + \tfrac{1}{3}A(X-d)^3 + D(X-d) + E$$
$$t_7 = -A(X+d)Y^2 - \tfrac{1}{3}A(X+d)^3 - D(X+d) + E$$

The composite-lens optical thickness $t_c$ is obtained by adding $t_4$ and $t_7$, with the following astonishing result:

$$t_c = t_4 + t_7 = -2Ad(X^2+Y^2) - \tfrac{2}{3}Ad^3 - 2Dd + 2E$$

The term $-2Ad(X^2+Y^2)$ describes a convex or converging spherical lens having a power (the reciprocal of focal length) proportional to $Ad$. All of the other terms are independent of X and Y, and therefore represent a uniform thickness over the whole area of the lens. Thus, it is readily apparent that the composite lens described is, in the thin lens approximation, a theoretically perfect spherical lens of variable power, the power being linearly proportional to the distance $d$ that the lens elements are displaced from their neutral positions. If the algebraic sign of $d$ is reversed by sliding element 4 toward the left and element 7 toward the right at FIGURE 5, the algebraic signs of all terms in the above relation for $t_c$ become positive, and the first term will describe a concave or diverging lens having a power proportional to $Ad$. Since it is conventional to refer to the power of a converging lens as positive, and that of a diverging lens as negative, it is apparent that the algebraic sign of the power is opposite to the algebraic sign of the term $2Ad(X^2+Y^2)$. The range of power variation for a given displacement $d$ is determined by the value of the coefficient $A$, which can be selected for this purpose.

For best results, as a general rule, the two lens elements should be moved by equal amounts in opposite directions along the X axis. However, this is not essential in all cases—in some cases only one element may be moved. Assume, for example, that element 4 is moved a distance $d$ in the positive X direction, while element 7 remains stationary at the neutral position. The composite-lens optical thickness is now:

$$t_c = t_4 + t_7 = -Ad(X^2+Y^2) + Ad^2X - \tfrac{1}{3}Ad^3 - Dd + 2E$$

When this equation is compared with the equation for moving both lens elements, only two significant differences will be noted: First, the change in power of the spherical lens is only one-half as great, which was to be expected because the relative movement between the two lens elements is only half as great. Second, an additional term $Ad^2X$ has appeared in the composite lens thickness equation. This term represents a variable prism along the X axis of the lens.

In some cases, the presence of a variable prism may be advantageous—for example, to compensate for parallax—and in many other cases, being small, it is not particularly objectionable. The type of effect under consideration can be appreciated by moving a pair of conventional spectacles up or down a fraction of an inch while looking through the lenses. Also, it is possible to minimize the variable prism effect by introducing a compensating variable prism into the lens. This is done by adjustment of the optional terms in the lens equation, specifically, the term in $x^2$. Thus, the lens equation for element 4 becomes:

$$t_4 = A(xy^2 + \tfrac{1}{3}x^3) + Bx^2 + Dx + E$$

Using the same equation for element 7, but with the algebraic signs of the coefficients A, B and D reversed, the composite-lens optical thickness upon displacement of lens element 4 a distance $d$ in the positive X direction, element 7 remaining stationary at the neutral position, is:

$$t_c = t_4 + t_7 = -Ad(X^2 + Y^2) + (Ad^2 - 2Bd)X \\ - \tfrac{1}{3}Ad^3 + Bd^2 - Dd + 2E$$

Now the variable prism term is $(Ad^2 - 2Bd)X$. By choice of an appropriate value for B in relation to the chosen value of A, the prism can be made zero at any selected value of $d$, as well as at zero, and thus the amount of variable prism can be minimized over a considerable range of values for $d$. B will usually be smaller than $Ad$, and, in general $B/A$ should be much smaller than the length of the lens element in the $x$ direction.

In the foregoing discussion, it has been illustrated that the optional terms of the lens equation may be employed without changing the fundamental nature of the variable-power spherical lens, which is achieved by means of the characterizing terms. Certain uses for these optional terms have also been pointed out. Other uses for the optional terms will become apparent to lens designers. In general, the $x^2$ term provides a variable prism in the X axis, and the $xy$ term provides a variable prism in the Y axis. These variable prisms may be used, for example, to compensate for parallax in camera lenses and other optical devices. The $Dx$ term, which is used to minimize the overall thickness of the lens system, provides a variable thickness, which has no appreciable effect upon the focusing of the lens.

It is not essential that the optional terms in the equation for one lens element be matched by corresponding terms of opposite algebraic sign in the lens equation of the other element, unless a lens is desired having the optical properties of a flat glass plate when the lens elements are in neutral position. In the case of one lens element moving while the other remains stationary, for example, it is evident that a non-variable lens may be combined with the stationary element of the variable lens, merely by adding the thickness equation for the desired non-variable lens to the thickness equation of the stationary element of the variable lens. This will generally amount to the addition of certain optional terms to the equation for the stationary lens element, without the addition of matching terms in the equation of the movable lens element. Since non-variable spherical lenses of any power, and non-variable cylinders, with any orientation of the cylinder axis within the plane of the lens, can be expressed by terms in $x^2$, $xy$ and $y^2$, and non-variable prisms, with any orientation of the prism axis within the plane of the lens, can be expressed by terms in $x$ and $y$, the optional terms are adequate to cover all of the common lens forms.

Even if both lens elements move, non-variable lenses can frequently be added to either one or both of the variable lens elements by variation of their optional terms, if it is desired to do so. Furthermore, any thickness variation that is independent of $x$ can be introduced into either lens element through the optional $F(y)$ term. This invention may also be applied to lens elements that are divided into zones separated by abrupt steps or changes in thickness, as in Fresnel lenses and the like, in which case the thickness equations hereinbefore disclosed are applicable with the proviso that the constant term E may be given different values for each of the zones.

Thus, the basic lens equation of this invention encompasses a broad range of lens designs having a substantial range of power variation, all characterized, however, by the unique characterizing terms of the lens equation, which are the only terms containing a power of $x$ higher than $x^2$, having a coefficient of considerable magnitude relative to the constant A, by means of which the novel, variable-power lenses of this invention are achieved. It should also be understood that the non-variable lens elements of a lens system need not be combined with the variable-focus lens elements—this invention may be used in multi-element lens systems of any complexity, wherein one or more pairs of the lens elements herein disclosed are incorporated as variable-focus components.

In deriving the lens equations set forth herein, the usual mathematical approximations that are valid for thin lenses, such as spectacle lenses, were made. Specifically, it was assumed that the transverse displacement of a light ray as it passes through the lens is negligible; that the sines of all deflection angles are numerically equal to the angles themselves, measured in radians; and that the deflection angle is independent of the tilt of a lens element with respect to the incoming or outgoing light rays. All of these assumptions are valid for spectacle lenses; therefore, in variable-focus spectacles and other comparable optical devices, the actual thicknesses of the variable-focus lens elements, designed for high-quality lenses, will closely conform to the lens equations hereinbefore set forth.

However, this invention is not limited to such thin lenses; it may also be used in relatively thick lens systems, such as fast camera lenses, and in other cases where the thin lens assumptions are not valid. In such cases, the basic lens equations hereinbefore set forth may be used to obtain a first tentative design. Then, the aberrations of the lens may be investigated, using graphical ray-tracing, machine-computation, and other techniques known to those skilled in the art, to revise the lens design for minimizing the aberrations. In general, the thickness variations in the final design will differ to only a slight extent from the prescription specified by the basic lens equation: hence, the thicknesses of the variable-focus lens elements will substantially conform to the basic lens equations herein disclosed. The correction of aberrations may introduce into the lens equation additional terms having powers of $x$ higher than $x^2$, or products of $x$ and $y$ in which either $x$ or $y$ has a power greater than 1, but the coefficients of such other terms will be small compared to the constant A, and hence these other terms will not affect the substantial conformity of the lens to the basic lens equations herein set forth.

FIGURES 6 through 11 illustrate a preliminary design for a lens element to be used in variable-power spectacles. FIGURE 6 is a plan view of the lens element 10 and FIGURES 7–11 are sections taken along the correspondingly numbered lines of FIGURE 6. Thickness has been exaggerated for clarity, and the bottom surface of the lens element has been shown as flat. In actual spectacles, the whole lens would preferably be dished outwardly in the customary manner, which would be accomplished by making one lens element with a concave spherical surface instead of the flat surface shown, and making the other lens element with a convex spherical surface instead of the flat surface shown. The surfaces illustrated as curved would be altered correspondingly to maintain the thickness variations unchanged.

The range of values between $+d$ and $-d$, hereinafter designated $\Delta d$—the maximum distance that each lens element may move—was set by the amount of allowable space in the spectacle frames. If this value were set too high, the frames would have to be unduly thick or wide for cosmetic acceptance. A conservative figure of $\Delta d = 0.25$ cm. was chosen for this example—that much movement is possible within conventional spectacle frames without materially increasing their size. Next, the desired power variatiion $\Delta P$ of the lens was set. The maximum power variation needed in spectacles is generally accepted to be about 3 diopters. In practice, more than 90% of all bifocal lenses have a variation of less than 2 diopters power between the near-vision and distant-vision portions of the lens. The ability of most people to use a variation of 2 diopters rather than of 3 diopters comes from the ability of their eyes to accommodate to some extent. Furthermore, the eye itself has a finite depth of focus, which makes up for a portion of the lack of correction in the lenses of the glasses.

Having set the amount of power variation at 3 diopters, or $\Delta P = 0.03$ cm.$^{-1}$, and having set $\Delta d = 0.25$ cm., the value of A—the coefficient of the characterizing term of the lens equation—was calculated from the relation:

$$A = \frac{\Delta P}{4\Delta d(n-1)}$$

wherein $n$ is the refractive index of the lens material. For this example assuming $n=1.5$, $A=0.06$ cm.$^{-2}$.

A value of D—the coefficient of the term in $x$—was chosen to minimize the overall thickness of the lens. To do this, the maximum thickness along the edge of the lens element was equated to the maximum thickness along the $x$ axis. The value of D varies depending on the shape of the lens and its size or radius, as well as on the value of A. Spectacle lenses are substantially circular in shape, having a typical radius of about 2.0 cm. For this example, $D=0.106$, and in general less than 0.20.

The value of E—the constant term of the lens equation—was selected such that the thinnest part of the lens element is just thick enough for adequate mechanical strength. First, a tentative value of E was selected, which is just large enough that the lowest points on the curved surface are not negative. This gives a tentative value of 0.094 cm. This may then be increased, for mechanical strength, to a final value of approximately $E=0.1$ cm. In general, E is less than one-tenth of the lens radius.

Thus, the lens equation for the typical element that was designed, with all dimensions expressed in cm., is:

$$t = 0.06xy^2 + 0.02x^3 - 0.106x + 0.1$$

When two elements designed as above were placed in optical tandem relation, the overall thickness of the system in neutral position, allowing for the air space between the elements, was slightly greater than 2.0 mm. This is well within the cosmetic limitations of spectacle lenses.

Considering the range of values of the necessary constants A, D and E for practical lens systems, note $\Delta P = 2Ad100$ for a variable focus thin lens of this type, wherein $\Delta P$ is the change in power (in diopters) when the total movement of the two lens elements is $d$ cm. This relation may be established at $y=0$ from the "lens makers' formula" applied to a shallow parabola and taking an index of refraction of 1.5. With a maximum displacement of $d = \pm 0.25$ cm. and $\Delta P = 3$ diopters; $A = 0.06$ cm.$^{-2}$. In the practical case of a spectacle lens having a diameter of about 4 cm., $x$ and $y$ vary from $-2$ cm. to $+2$ cm. Neglecting the third and fourth terms (D and E) in the deriving equation, $$t_{\max} = Axy^2 + \frac{A}{3}x^3$$

so when $y=0$ $$t_{\max} = \frac{A}{3}x^3{}_{\max}$$

or $$t_{\max} = \pm 0.16 \text{ cm.}$$

Inclusion of the D and E terms somewhat changes this, to about 0.20 cm. out of a diameter of 4 cm., and consequently the lens is certainly "thin" so that approximations herein are valid.

Clearly, constants of the formula may be varied somewhat; however, for spectacles wherein $\Delta P$ is only required to be 2 to 3 to accommodate changes from infinity to reading distance, A may be safely taken in the range of 0.01 cm.$^{-2}$ to 0.30 cm.$^{-2}$ for spectacles. For other applications A may be made even greater, but for the borderline case of $A=0.6$ cm.$^{-2}$, for example, the glasses would have a thickness of the order of one centimeter, which is hardly practical from a cosmetic viewpoint. Camera applications, on the other hand, allow the displacement $d$ to be several times the width of the lenses and thus the factors discussed above may have an even wider range than stated and yet retain the approximations of thin lenses.

FIGURE 12 illustrates two such lens elements in tandem, forming a variable-focus spectacle lens. The rear element 11 has a concave spherical back surface, and the front element 12 has a convex spherical front surface, giving the lens element as a whole the characteristic dished shape of a spectacle lens. The front surface of element 11 and the back surface of element 12 are curved in such a manner that the thickness of each element conforms to the principles and equations herein set forth, the X axis of the lens system being vertical in this example. The two lens elements 11 and 12 are connected at their tops and bottoms by two flexible metal bands 13 and 14, which pass over two shafts 15 and 16, as shown. Thus, upon rotation of the shafts, one lens element moves up and the other element moves down, to vary the power of the lens. A non-variable lens component may be combined with the variable lens elements, in a manner hereinbefore described, or provided in the form of a third stationary lens element in tandem with the variable lens elements 11 and 12 as illustrated. The non-variable lens element would be ground in accordance with the user's eyeglass prescription for distant vision, plus, preferably, an additional $+1.5$ diopters. Thus, with the variable-focus lens set for $-1.5$ diopters, the combined lens system would have the desired power for distant vision. By adjustment of the variable-focus lens, additional power of any amount up to 3 diopters is readily obtained.

In summary, a wide variety of lens designs are possible employing the novel principles herein disclosed, and the invention is not limited to specific examples herein set forth. To achieve a useful range of power variation, without introducing intolerable distortion in the composite lens, the lens elements are formed with an optical thickness substantially conforming to a lens equation containing the characterizing terms $t = A(xy^2 + \frac{1}{3}x^3)$, these being the only terms of the lens equation containing a power of $x$ higher than $x^2$, or a product of $x$ and $y$ in which either $x$ or $y$ has a power greater than 1, and having a coefficient of considerable magnitude relative to the constant A. Lens elements having surfaces formed as segments of a cone or involute of a circle, employed in unsuccessful prior attempts to produce variable-focus lenses, have equations that approximate the lens equations of this invention only for power ranges so small as to be of no significant practical value, whereas, attempts to make lenses having a useful power variation following the teachings of the prior art fail because of the intolerable distortions resulting from the erroneous criteria set forth in the prior art for defining the shape of the lens elements of the variable-power lens.

What is claimed is:

1. A variable-power lens comprising two lens elements arranged in tandem, one behind the other along the optical axis of the lens, and means for moving at least one of said elements relative to the other in a direction transverse to the optical axis of the lens, each of said elements having polished surfaces with one of the surfaces being a regular surface of revolution and an optical thickness variation parallel to the optical axis less than one-half the lens diameter, and the optical thickness of each element being substantially defined by the formula $$A(xy^2 + \tfrac{1}{3}x^3) + Dx + E$$

wherein D is a constant representing the coefficient of a prism removed to minimize lens thickness and may be zero, E is a constant representing lens thickness at the optical axis, $x$ and $y$ represent coordinates on a rectangular coordinate system centered on the optical axis and lying in a plane perpendicular thereto, and A is a constant representing the rate of lens power variation with lens movement in the $x$ direction and being positive for one lens element and negative for the other lens element.

2. A variable-power lens comprising two lens elements arranged in tandem, one behind the other along the optical axis of the lens, each of said lens elements having optically polished surfaces and one surface of each lens being a regular surface of revolution, and means for moving said elements equally in opposite directions perpendicularly transverse to the optical axis of the lens, said one element having an optical thickness $t_4$ parallel to the optical axis substantially defined by the equation $$t_4 = A(xy^2 + \tfrac{1}{3}x^3) + Dx + E$$

and said other element having an optical thickness $t_7$ parallel to the optical axis substantially defined by the equation $$t_7 = -A(xy^2 + \tfrac{1}{3}x^3) - Dx + E$$

wherein $x$ and $y$ represent coordinates with respect to an $x$ axis extending in the direction of such motion and a $y$ axis extending perpendicular to the $x$ axis and the optical axis, and A is a constant representing the rate of lens power variation with lens movement, D is a constant representing the coefficient of a prism removed to minimize overall lens thickness, and E is a constant representing the lens thickness at the optical axis and having a value sufficient to insure structural lens rigidity at the thinnest point thereof.

3. A variable power lens comprising two lens elements disposed in closely spaced alignment along an optical axis with each element having at least one surface of varying curvature with all lens surfaces having all portions thereof inclined at angles less than forty degrees to a plane perpendicular to the optical axis, one surface of each lens being a regular surface of revolution, each of said elements having a thickness proportional to $$A(xy^2 + \tfrac{1}{3}x^3) + E$$

wherein E is a constant representing the lens thickness at the optical axis, and A is a constant representing the lens power variation generated by relative movement of the lens elements and having opposite signs for separate elements, and wherein $x$ and $y$ are coordinate points on a rectangular coordinate system centered on the optical axis and lying in a plane perpendicular to said axis, and means for moving said elements relative to each other transverse to the optical axis for varying the power of said lens.

4. A variable-power lens as set forth in claim 3 further defined by the constant A having a value in the range of 0.01 to 0.30 per centimeter squared, the term $x$ being multiplied by a constant having a maximum value of about 0.20, and the lens elements having a maximum dimension of about four centimeters whereby the total lens has a thickness of the order of four millimeters.

5. Spectacles comprising two variable-power lenses, each lens comprising two lens elements arranged in tandem, one behind the other along the optical axis of the lens, each of said lens elements having one surface that is a regular surface of revolution, and means for moving one of said elements of each lens relative to the other element of the same lens in a direction transverse to the optical axis of the lens, said one element having an optical thickness $t$ substantially defined by an equation comprising the terms $$t = A(xy^2 + \tfrac{1}{3}x^3) + Dx + E$$

wherein $x$ and $y$ represent coordinates with respect to an $x$ axis extending in the direction of such motion and a $y$ axis extending perpendicular to the $x$ axis and the optical axis, and A, D, and E are constants unequal to zero with A representing the rate of lens power variation with lens movement, $Dx$ representing a prism removed to minimize overall lens thickness, and E representing the lens thickness at the optical axis, said equation comprising no other terms containing powers of $x$ greater than $x^2$ and yielding a contribution to the thickness comparable to that given by the first two terms of the equation.

6. Variable power spectacles having a maximum width of the order of four centimeters comprising first and second thin lens elements having polished surfaces with one surface of each element being a regular surface of revolution, the thickness of each element varying linearly with $$xy^2 + \frac{x^3}{3}$$

to provide a second surface of variable curvature, wherein $x$ and $y$ are points on a coordinate system lying in a plane perpendicular to the optical axis of the system, and the thickness of each lens element is of the order of two-tenths of a centimeter and means for moving said elements relative to each other transverse to the optical axis for varying the power of said spectacles.

References Cited by the Examiner

UNITED STATES PATENTS 2,263,509  11/1941  Lewis _____ 88—57

FOREIGN PATENTS 250,268  7/1926  Great Britain.

JEWELL H. PEDERSEN, *Primary Examiner.*

JOHN K. CORBIN, *Examiner.*